United States Patent [19]

Melby et al.

[11] Patent Number: 4,876,308

[45] Date of Patent: Oct. 24, 1989

[54] POLYURETHANE ADHESIVE FOR A SURFACE TREATMENT-FREE FIBER REINFORCED PLASTIC

[75] Inventors: Earl G. Melby, Uniontown; H. William Cocain, Cuyahoga Falls, both of Ohio

[73] Assignee: GenCorp Inc., Akron, Ohio

[21] Appl. No.: 158,005

[22] Filed: Feb. 18, 1988

[51] Int. Cl.$^4$ .............................................. C08L 75/04
[52] U.S. Cl. ..................................... 524/780; 524/781; 524/783; 524/786; 524/789; 156/331.4; 428/432.1; 428/425.8; 528/65; 528/66
[58] Field of Search ............... 524/780, 781, 783, 786, 524/789, 791; 156/331.4; 428/423.1, 425.8; 528/65, 66

[56] References Cited

U.S. PATENT DOCUMENTS

| 3,647,513 | 3/1972 | Jackson | 117/47 |
| 3,703,426 | 11/1972 | Larson et al. | 156/208 |
| 3,714,127 | 1/1973 | Fabris et al. | 260/77.5 |
| 3,812,003 | 5/1974 | Larson et al. | 161/156 |
| 3,838,093 | 9/1974 | Owston | 260/33.8 |
| 3,886,122 | 5/1975 | Fabris et al. | 260/75 |
| 3,935,051 | 1/1976 | Bender et al. | 156/331 |
| 3,962,498 | 6/1976 | Owston | 427/322 |
| 4,004,050 | 1/1977 | Rabito et al. | 427/302 |
| 4,247,676 | 1/1981 | Kimball | 528/67 |
| 4,336,298 | 6/1982 | Schwarz | 428/285 |
| 4,373,082 | 2/1983 | Kimball et al. | 528/60 |
| 4,390,678 | 6/1983 | LaBelle et al. | 528/60 |
| 4,397,707 | 8/1983 | Dawdy | 156/307.5 |
| 4,444,976 | 4/1984 | Rabito | 528/60 |
| 4,552,934 | 11/1985 | Rabito et al. | 525/458 |
| 4,595,445 | 6/1986 | Hombach et al. | 156/307.3 |
| 4,624,996 | 11/1986 | Rizk et al. | 525/453 |

OTHER PUBLICATIONS

Article "New Urethane Adhesive and Adhesive Sealants for Bonding SMC" by Foreman et al., 35th Annual Technical Conference, 1980, Reinforced Plastics/Composites Institute, The Society of the Plastics Industries, Inc.

Primary Examiner—Maurice J. Welsh

[57] ABSTRACT

A two component type polyurethane adhesive is provided for fiberglass reinforced plastics which requires no cleaning, preparation or treatment of the surface, and the like. The curative component is a nitrogen-free liquid polyether or polyester in an amount such that in association with a urethane prepolymer component containing free NCO groups, the ratio of the free NCO groups in the prepolymer component to the OH groups in said curative component is at least 1.2 and desirably at least 1.35. Such high NCO/OH ratios have unexpectedly been found to provide good adhesion and especially good humidity adhesion and peel strength adhesion to fiberglass reinforced plastics or metal surfaces which are free from any surface treatment.

21 Claims, No Drawings

POLYURETHANE ADHESIVE FOR A SURFACE TREATMENT-FREE FIBER REINFORCED PLASTIC

FIELD OF THE INVENTION

The present invention relates to a two-component type polyurethane adhesive composition containing a high equivalent ratio of free NCO groups in the prepolymer component to OH groups in the curative component. The urethane adhesive is applied directly to non-treated surfaces such as fiberglass reinforced plastics or metals.

BACKGROUND

Heretofore, in order to achieve satisfactory adhesion to fiberglass reinforced plastics (FRP) or between a FRP and a metal surface, it has always been necessary to treat the surface of the fiberglass reinforced plastic before applying the polyurethane adhesive. Such surface treatments include a mechanical treatment such as abrading or sanding the fiberglass reinforced plastic or metal surface, a solvent treatment such as scrubbing the surface with a solvent such as methylene chloride, and a chemical treatment as by applying a primer thereto.

The following patents relate to surface treatments which improve the adhesion to fiberglass reinforced plastic surfaces.

U.S. Pat. No. 3,647,513 to Jackson relates to a method of improving the adhesion of a polyester composition to itself or to a metal. This is achieved by treating the surface of the polyester composition such as a fiberglass reinforced plastic with a tertiary amine prior to bonding with a urethane adhesive.

U.S. Pat. No. 3,703,426 to Larson et al relates to using a di- or a triisocyanate as a primer which is applied to a fiberglass reinforced surface prior to bonding with a urethane adhesive.

U.S. Pat. Nos. 3,838,093 and 3,962,498 to Owston relate to priming a fiberglass reinforced plastic with an organic solvent solution containing a partial urethane adduct.

U.S. Pat. No. 4,004,050 to Rabito et al relates to treating a fiberglass reinforced plastic with an organic solvent solution containing an organic polyisocyanate followed by a subsequent treatment of a solution of an organic tertiary amine before bonding with a polyurethane adhesive.

U.S. Pat. No. 4,397,707 to Dawdy relates to a primer composition containing an aromatic polyisocyanate and an amino resin and moisture curing the polyisocyanate compound prior to the application of the adhesive. The composition is used as a surface treatment of fiberglass reinforced plastics before bonding with acrylic adhesives.

The following patents relate to surface treatment and/or polyurethane adhesives.

U.S. Pat. No. 3,714,127 to Fabris et al relates to a sag resistant polyurethane adhesive wherein small amounts of a di- and a multi-primary amine are added to a two-component polyurethane system wherein the equivalent ratio of free NCO to OH is only up to a maximum of 1.15.

U.S. Pat. No. 3,886,122 to Fabris et al relates to a two-component polyurethane adhesive composition which has minimum sensitivity to moisture by limiting the ratio of active hydrogen atoms to isocyanates to from about 1.1 to about 1.9 and hence as an excess of a polyol curing agent.

U.S. Pat. Nos. 3,935,051 to Bender et al and 3,812,003 to Larson et al relate to a two component polyurethane adhesive made from an isocyanate prepolymer and a curative made from a nitrogen containing polyol.

U.S. Pat. No. 4,247,676 to Kimball et al relates to the utilization of an alkali metal salt of MDA (4,4'-diphenylmethanediamine) as a curative.

U.S. Pat. No. 4,336,298 to Schwarz relates to FRP surfaces which are primed with a solution of triphenylmethane diisocyanate in methylene chloride. A curative containing various types of aromatic diamines is used to react stoichiometrically or in excessive amounts with the free NCO groups of the urethane prepolymer.

U.S. Pat. No. 4,373,082 to Kimball et al relates to a curative for a two component urethane adhesive in which the curative is made from a mixture of a polyol and a polyamine with said polyamine being reacted with an organic polyisocyanate to form micelles that exhibit upon NMR examination strong urea peaks and weak urethane peaks. The adhesive desirably has sag resistance. The equivalent ratio of free isocyanate groups to OH groups of the curative is not specified.

U.S. Pat. No. 4,390,678 to LaBelle et al relates to a one component urethane adhesive system which is applied to an FRP. A solid polyhydroxy curative is utilized.

U.S. Pat. No. 4,444,976 to Rabito relates to an improved two-component urethane adhesive which exhibits sag resistance wherein the curative component utilizes a secondary amine such as a dialkyl-N,N'-alkylenediamine.

U.S. Pat. No. 4,552,934 to Rabito et al relates to an anti-sag polyurethane composition utilizing a curative which is made by partially reacting a polyol with an organic polyisocyanate. To the partially reacted polyol is added a small amount of a polyamine, for example ethylenediamine.

U.S. Pat. No. 4,595,445 to Hombach et al relates to a one-component urethane system in which a portion of the free NCO groups are blocked so that the adhesive composition is stable at ambient temperature but reacts at higher temperatures.

U.S. Pat. No. 4,624,996 to Rizk et al relates to a one-component urethane adhesive system in whih the free polyisocyanate is blocked with an oxime compound.

The article "New Urethane Adhesives and Adhesive Sealants for Bonding SMC" by Foreman et al, 35th Annual Technical Conference, 1980, Reinforced Plastics/Composites Institute, The Society of the Plastics Industries, Inc., relates to a primed substrate to which is added a two part urethane system.

SUMMARY OF THE INVENTION

A two-component urethane adhesive system is provided for at least one FRP substrate free of any surface treatment, that is free of any mechanical treatment, any solvent treatment, or any chemical treatment such as a primer. The urethane prepolymer component contains free NCO groups therein. The curative component, in addition to containing a polyol having two or more active hydroxyl groups, often contains an inert powdery mineral filler, a primary amine to thicken the adhesive system, and a urethane catalyst. The polyol curative is a nitrogen-free, liquid polyester or polyether polyol. It is an important aspect of this invention in order to obtain good adhesion to treatment-free FRP or metal substrate that the equivalent ratio of the free NCO groups to the active OH groups and the NH groups of the curative component be greater than 1.2 and desirably greater than 1.35.

DETAILED DESCRIPTION OF THE INVENTION

The two component polyurethane adhesive composition of the present invention contains a urethane prepolymer component and a curative component. The urethane prepolymer component is made from a polyol intermediate and an excess equivalent amount of a polyisocyanate so that free NCO groups exist. Such free NCO groups are located on the ends of the prepolymer and on the unreacted polyisocyanate. Typically, the prepolymer reaction takes place in the presence of a moisture free powdery mineral filler.

The polyol intermediate is generally a liquid polyether polyol or a polyester polyol, or combinations thereof having a number average molecular weight of from about 400 to about 10,000 with from about 2,000 to about 4,000 being preferred. A wide range of polyether or polyester polyols can be used in making the adhesives of the present invention such as diols, triols, tetrols, and the like. Polyether polyols are generally made by reacting an alkylene oxide having from 2 to 10 carbon atoms such as propylene oxide with a strong base such as potassium hydroxide, preferably in the presence of water, glycols and so forth. Polyethers having a highly branched chain are readily prepared from alkylene oxides and initiators having an active hydrogen functionality greater than 2. The higher functional initiators that are useful with the alkylene oxides described above include polyols, polyamines and amino alcohols having a total of three or more reactive hydrogen atoms on hydroxyl and primary or secondary amino groups and generally having up to 12 carbon atoms.

Suitable polyols include triols, such as glycerol, trimethylolpropane, butanetriols, hexanetriols, trialkanolamines, various diethylenetriamines, such as erythritol and pentaerythritol; pentols, hexols, such as dipentaerythritol and sorbitol; as well as alkyl glucosides, carbohydrates, polyhydroxy fatty acid esters such as castor oil; and polyoxy alkylated derivatives or polyfunctional compounds having three or more reactive hydrogen atoms, such as, the reaction product of trimethylolpropane, glycerol and other polyols with ethylene oxide, propylene oxide or other epoxides or copolymers thereof, e.g., copolymers of ethylene and propylene oxides, with ethylene oxide being used in a molar amount of not over 20 mol percent as compared to other alkylene oxides like propylene oxide. Examples of higher functional amino alcohols and polyamines include ethanolamine, diethanolamine, triethanolamine, isopropanolamine, diisopropanolamine, triisopropanolamine, 2-(2-aminoethylamino)ethanol, 2-amino-2-(hydroxymethyl)-1,3-propanediol, ethylenediamine, diethylenetriamine, triethylenetetramine, and urea as well as various aryl polyamines such as 4,4',4''-methylidyne-trianiline.

Other polyethers which can be utilized are those which are produced as by polymerization of tetrahydrofuran or epoxides (such as ethylene oxide, propylene oxide, butylene oxide, styrene oxide, or epichlorohydrin), or by addition of epoxide compounds (preferably ethylene oxide or propylene oxide), alone, in a mixture, or in succession, to starting components with reactive hydrogen atoms such as water, polyhydric alcohols, ammonia or polyfunctional amines.

Polyester polyols are formed from the condensation of one or more polyhydric alcohols having from 2 to 15 carbon atoms with one or more polycarboxylic acids having from 2 to 14 carbon atoms. Examples of suitable polyhydric alcohols include the following: ethylene glycol, propylene glycol such as 1,2-propylene glycol and 1,3-propylene glycol, glycerol; pentaerythritol; trimethylolpropane; 1,4,6-octanetriol; butanediol; pentanediol; hexanediol; dodecanediol; octanediol; chloropentanediol, glycerol monallyl ether; glycerol monoethyl ether, diethylene glycol; 2-ethylhexanediol-1,4; cyclohexanediol-1,4; 1,2,6-hexanetriol; 1,3,5-hexanetriol; 1,3-bis-(2-hydroxyethoxy)propane and the like. Examples of polycarboxylic acids include the following: phthalic acid; isophthalic acid; terephthalic acid; tetrachlorophthalic acid; maleic acid; dodecylmaleic acid; octadecenylmaleic acid; fumaric acid; aconitic acid; trimellitic acid; tricarballylic acid; 3,3'-thiodipropionic acid; succinic acid; adipic acid; malonic acid, glutaric acid, pimelic acid, sebacic acid, cyclohexane-1,2-dicarboxylic acid; 1,4-cyclohexadiene-1,2-dicarboxylic acid; 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Preferred polycarboxylic acids are the aliphatic and cycloaliphatic dicarboxylic acids containing no more than 14 carbon atoms and the aromatic dicarboxylic acids containing no more than 14 atoms. Any polyhydric alcohol having more than 2 hydroxyl groups or any polycarboxylic acid having more than 2 carboxylic groups used to make the polyesters should be used in only very minor amounts to prevent crosslinking and gelling.

Polyesters from lactones (for example ε-caprolactone) and polyacetals, polycarbonates or polybutadienes containing terminal hydroxyl groups are also suitable.

Highly preferred polyol intermediates include polypropylene ether diol, poly-1,2-butylene ether diol, poly-1,4-tetramethylene ether, and epsilon-polycaprolactone diols.

In order to achieve specific properties which are influenced by the composition and content of polyurethane hard blocks, small amounts of polyhydric alcohols are optionally utilized in combination with the above-noted liquid polyether or polyester glycol intermediates. The polyhydric alcohols generally have from 2 to 15 carbon atoms with specific examples including ethylene glycol, 1,2-propylene glycol, 1,3-propylene glycol, 1,4-butane diol, 2,3-butane diol, 1,5-pentanediol, glycerol, sorbitol, pentaerythritol, dipropylene glycol, diethylene glycol, and the like. The amount of such polyhydric alcohols is generally from about 0 or 1 to about 40 parts by weight and preferably from about 0 or 1 to about 10 parts by weight based upon 100 parts by weight of the polyether polyol intermediate, the polyester polyol intermediate, or combinations thereof.

The equivalent ratio of the polyisocyanate utilized to make the prepolymer to the hydroxyl containing polyol intermediate (NCO/OH) is generally from about 2 to about 20 and preferably from about 5 to about 10. Such large excesses are necessary to achieve relatively low molecular weight polyurethane prepolymers, since the hydroxyl groups of the intermediate are capped without significant chain extension. The polyisocyanates generally have the formula $R(NCO)_n$ where n is an integer of 2, 3 or 4 with approximately 2 being preferred. However, it is to be understood that since combinations of various polyisocyanates can be utilized, the equivalent amount of isocyanate can vary and often is not an integer. R is an aliphatic having from about 2 to about 20 carbon atoms with from about 6 to about 15 carbon atoms being preferred, an aromatic including an alkyl substituted aromatic having from about 6 to about 20 carbon atoms with from about 6 to about 15 carbon atoms being preferred, or combinations thereof. Aromatic diisocyanates are desired since the aliphatic diisocyanates generally react too slow. Examples of suitable polyisocyanates include 1,6-diisocyanato hexane, 2,2,4- and/or 2,4,4-trimethyl hexamethylene diisocyanate, p- and m-tetramethyl xylene diisocyanate, dicyclohexylmethane-4,4'-diisocyanate (hydrogenated MDI), 4,4-methylene diphenyl isocyanate (MDI), p- and m-phenylene diisocyanate, 2,4- and/or 2,6-toluene diisocyanate (TDI), durene-1,4-diisocyanate, isophorone diisocyanate, isopropylene-bis-(p-phenyl isocyanate) and sulfone-bis-(p-phenyl isocyanate). Also useful are diisocyanates prepared by capping low molecular weight, that is less than 300, diols, ester diols or diamines with diisocyanates, such as the reaction products of one mole of 1,4-butanediol or bis-(4-hydroxybutyl)-succinate (molecular weight=262) with two moles of hexamethylene diisocyanate. Any combination of diisocyanates can also be employed. Combinations of slower reacting aliphatic with faster reacting aromatic diisocyanates can be advantageously used. Examples of still other isocyanates include 1,5-naphthalenediisocyanate, cumene-2,4-diisocyanate, 4-methoxy-1,3-phenylenediisocyanate, 4-chloro-1,3-phenylenediisocyanate, 4-bromo-1,3-phenylenediisocyanate, 4-ethoxy-1,3-phenylenediisocyanate, 2,4'-diisocyanatodiphenylether, 4,4'-diphenyldiisocyanate, 4,6-dimethyl-1,3-phenylenediisocyanate, 1,10-anthracenediisocyanate, 4,4'-diisocyanatodibenzyl, 3,3-dimethyl-4,4'-diisocyanatodiphenylmethane, 2,6-dimethyl-4,4'-diisocyanatodiphenyl and others and mixtures of the same. TDI is desirably utilized. The various diphenylmethane diisocyanates (MDI) and mixtures of MDI with polymeric MDI having an average isocyanate functionality of from about 2 to about 3.2 are preferred.

Numerous fillers can be utilized in the prepolymer component. The fillers are generally mineral (inorganic), and in a powdery form and serve to adjust the urethane prepolymer adhesive component viscosity as well as to lower the cost thereof. The fillers can at times impart improved adhesion. Examples of specific fillers include ground mica, talc, kaolin clay, calcium carbonate, calcium sulfite, colloidal silica, wollastonite, ballotini, hollow glass microspheres, glass, carbon and graphite fibers, various metallic oxides such as zinc, titanium, zirconium, and the like, ground quartz, various metallic silicates, metallic powders such as lead, aluminum, bronze, and the like. A preferred filler is talc. The amount of filler is generally an effective amount to produce a viscosity so that the prepolymer component can be readily pumped through processing equipment such as adhesive meter-mixing machines. Such an effective amount is usually from about 5 to about 100 parts by weight and preferably from about 20 to about 50 parts by weight per 100 parts by weight of the prepolymer.

The curative component contains a polyol having two or more active hydroxyl groups. Desirably the curative also contains an inert mineral powdery filler, a primary amine, a polyurethane catalyst, and various pigments or dyes. It is an important aspect of the present invention that the amount of curative compound is such that the equivalent ratio or isocyanate index groups of the prepolymer to OH+NH groups of the curative component is from about 1.2 to about 2.0, desirably 1.35 to about 1.6 and preferably 1.35 to about 1.45. Such equivalent ranges yield good adhesion to an FRP or to a metal substrate without the need of any surface pretreatment. That is, the surface is treatment-free. By the term "treatment-free" it is meant that the substrate such as the FRP or the metal need not be treated whatsoever (1) mechanically as by sanding, abrading, etc., (2) with a solvent such as methylene chloride, acetone, toluene, and the like, or (3) with a chemical treatment such as through the use of various primers, isocyanates, or amines. The formed adhesive is utilized to bond or adhere FRP to FRP, FRP to a metal, FRP to a painted metal, and FRP to various plastic substrates as for example polyurethane, polyurea, nylon, polydicyclopentadiene, molded epoxy, molded thermoplastic polyesters, and the like.

The curative polyol is a polyol which can be the same as the intermediate polyol utilized to form the prepolymer. Hence, the above description of the intermediate polyol is hereby fully incorporated by reference. An essential requirement of the polyol is that it be of a type such that a crosslinked polyurethane adhesive is formed upon cure of the adhesive composition. Thus, if the polyol intermediate and the polyisocyanate used to make the urethane prepolymer are essentially difunctional, the polyol curative should contain sufficient hydroxyls containing more than two OH groups per molecule so that a stable crosslinked network is formed when the curative is utilized. Alternatively, if either the intermediate polyol or the polyisocyanate used to make the prepolymer adhesive base has a functionality significantly greater than 2, the curative polyol may have a functionality of 2, or optionally greater than 2, to form the crosslinked network. Examples of curative polyols include a polyether or a polyester polyol having a molecular weight of from about 400 to about 10,000, such as the various above-noted polyol intermediates, or triols, tetrols, pentols, hexols, and the like as noted above.

However, various low molecular weight polyols are generally desired or preferred as the curative component. A class of such polyols include the alkyl, aromatic, or alkyl substituted aromatic diols having from 2 to about 12 carbon atoms with from about 2 to about 8 carbon atoms being preferred. Specific examples include ethylene glycol, propylene glycol, butane diol such as 1,4-butane diol, and the like. Another preferred class are the various polyhydric alcohols having from 3 to 15 carbon atoms and preferably from 3 to 10 carbon atoms and from 3 to 8 hydroxyl groups such as triols, tetraols, pentols, hexols, and the like with specific examples including glycerol, erythritol, pentaerythritol, arabitol, sorbitol, trimethylol propane, the various ethylene or propylene oxide adducts of trimethylol propane, glycerol, pentaerythritol, sorbitol, and the like. Included within the definition of low molecular weight polyols according to the concepts of the present invention are the various carbohydrates such as the various disaccharides and especially the monosaccharides, along with reaction products thereof with alcohols having from 1 to 5 carbon atoms such as for example alkyl glucoside, and the like. Examples of specific disaccharides include sucrose, lactose, and maltose. Examples of monosaccharides include the various pentoses such as arabinose, xylose, lyxose, ribose, as well as the various hexoses such as glucose, gulose, mannose, galactose, talose, allose, altrose, idose, fructose, sorbose, and the like can be utilized. Of the various carbohydrates, the various alkyl glucosides with the alkyl group having from 1 to 12 carbon atoms are preferred.

Examples of preferred polyols include ethylene or propylene oxide adducts of trimethylol propane, pentaerythritol, glycerol, alkyl glucosides, or carbohydrates, with the propylene oxide adduct of pentaerythritol being preferred.

The inert filler which is utilized in the curative component can be the same as set forth above. Hence, talc, kaolin clay, and colloidal silica are desired with talc being preferred. The amount of the inorganic inert material filler which is utilized in the curative component is an effective amount to produce a viscosity level which can be readily pumped through processing equipment such as adhesive meter mixing machines. Such a level is usually from about 5 parts to about 100 parts by weight and preferably from about 30 to about 60 parts by weight per 100 parts by weight of polyol curative.

Primary aliphatic amines are utilized to provide sag resistance to the adhesive composition or system once the polyol curative component and the urethane prepolymer component are mixed. The primary amine can be a di- or multifunctional primary amine having from about 1 to about 14 carbon atoms with from about 2 to about 8 carbon atoms being preferred. Examples of suitable primary amine compounds include diethylenetriamine, ethylenediamine, tetramethylenediamine, pentamethylenediamine, hexamethylenediamine, 2,5-diamine-n-hexane, xylene diamine and 1,3-diaminopropanol-2. Generally, ethylene diamine is preferred. The primary amine generally reacts with an equivalent amount of a free isocyanate group (NCO) in the adhesive base to produce a polyurea. The reaction is generally very quick and the polyurea produced forms a strong hydrogen bonded network and significantly increases the viscosity of the mixed adhesive before cure and thereby provides sag resistance. An effective amount of the polyurea is thus utilized to prevent sag in the end product before cure thereof. Such an effective amount is generally from about 1 to about 5 parts by weight and preferably from about 1 to about 3 parts by weight per 100 parts by weight of said polyol curative.

The catalyst used to promote the urethane chain extension and crosslinking reaction is preferably a tin compound such as, for example, various stannous carboxylates like stannous acetate, stannous octoate, stannous laurate, stannous oleate and the like; or dialkyl tin salts of carboxylic acids such as dibutyltin diacetate, dibutyltin dilaurate, dibutyltin maleate, dibutyltin di-2-ethylhexoate, dilauryltin diacetate, dioctyltin diacetate and the like. Similarly, there can be used a trialkyltin hydroxide, dialkyltin oxide or dialkyltin chloride. As an alternative or in addition to the above tin compounds, various tertiary amines can be used such as triethylamine, benzyldimethylamine, triethylenediamine and tetramethylbutanediamine. The tin catalysts, when utilized, are generally used in amounts of 0.5 parts or less, i.e., in the range of about 0.01 to 0.5 parts, by weight per 100 parts of prepolymer. The tertiary amine catalysts, when utilized, can be used in amounts of 0.01 to about 5 parts by weight per 100 parts of prepolymer. However, at least 0.01 part of at least one type of catalyst should be present. In addition to the above catalysts, organomercury or organic bismuth compounds can be utilized wherein the organic portion is an aliphatic and preferably an alkyl having from 2 to 20 carbon atoms. The amount is generally from about 0.01 to about 1.0 parts by weight per 100 parts by weight of the prepolymer.

If it is desired that the polyurethane adhesive composition of the present invention have a color or hue, any conventional pigment or dye can be utilized in conventional amounts. Hence, any pigment known to the art and to the literature can be utilized as for example titanium dioxide, iron oxide, carbon black, and the like, as well as various dyes provided that they do not interfere with the urethane reaction.

The curative component can generally be prepared in any conventional manner. For example, the filler can be added to the curative polyol and mixed therewith. Similarly, the primay amine, the various urethane catalysts, and the various pigments and dyes, if utilized, can also be added and mixed. Generally, any mixing order can be utilized. Similarly, the prepolymer component can be prepared in any conventional manner, for example, the filler can be added to the urethane prepolymer and mixed therewith. The two components can then be added to each other and mixed in a suitable manner as by using meter mixing equipment. The utilization of a primary amine results in an immediate reaction such that a gelis generally formed within 5 minutes and a cure is obtained within from about 20 to about 30 minutes at room temperatures. Generally to ensure the formation of a suitable adhesive bond within a relatively short time, that is generally less than 5 minutes and preferably less than 1 minute, the mixed urethane prepolymer component and curative component are heated to a temperature of at least 50° C. and preferably from about 90° to about 125° C. Naturally, the reaction time to form a suitable bond will depend upon the particular type of polyisocyanate utilized, the particular type of polyol curative utilized, the particular type of urethane catalyst utilized, the curing temperature, and the like.

The urethane adhesive compositions of the present invention are suitable for application to non-treated or surface-treatment free substrates such as FRP substrates, metal substrates, plastic substrates, and the like. The adhesive of the present invention can thus be utilized to bond at least two such substrates together to form a urethane adhesive composite. An area of particular use is in the automotive industry wherein FRP structural components are bonded to automobile body panels such as hoods, doors, fenders, front ends, trunk lids, and the like.

The invention will be better understood by reference to the following examples.

EXAMPLES

Examples 1 and 2 describe the preferred method of making the two adhesive components (base and curative). Example 3 describes the preparation of adhesive test speciments while Example 4 describes the specimen test procedures. The test results for specimens made at various isocyanate indices (NCO/OH+NH) are shown in Example 5 (Table 1). It is clear from the data that adhesives mixed at an isocyanate index of 1.38 and 1.50 gave superior adhesion even when the FRP surfaces ae unprimed. Example 6 (Table 2) shows that the adhesive mixed at an isocyanate index of 1.40 gave bonds to FRP (both primed and unprimed) which are resistant to the water immersion test. Example 7 (Table 3) shows that adhesively bonded FRP also has excellent adhesion at minus 40° C. An additional concern is that moisture can be absorbed on the FRP surface (particularly in a plant production environment) and that this absorbed moisture can adversely affect adhesive bonding, in particular when there is no precleaning of the FRP surface. In Example 8, FRP specimens were placed in a high humidity environment for 24 hours prior to bonding. The data in Table 4 shows that a high equivalent ratio of free isocyanate to polyol curative yields improved adhesion to non-treated humidified FRP samples than to treated surfaces using an adhesive having an equivalent ratio of 1.10. Hence, rather than yielding reduction in adhesion to a non-treated surface as would be expected, the result of improved adhesion was unexpected. The performance of the high isocyanate index adhesive, that is the equivalent ratio of free prepolymer component NCO groups to hydroxyl and amine groups of the curative component, was compared with adhesive mixed at a normal index at a high temperature. Since curing of the high index adhesive could result in some allophanate crosslinking, there may be a concern about performance at elevated temperatures such as that encountered in paint ovens. The data in Table 5, however, shows that the high index adhesive performed very well at a high temperature (166° C.). Peel adhesion has been previously shown to be a problem if a two-component polyurethane adhesive is applied to unprimed FRP. The data in Example 10 (Table 6) shows that the adhesive mixed at a high index (1.40) has excellent peel adhesion in the Wedge Peel Test.

All parts set forth in the examples are by weight unless otherwise indicated.

EXAMPLE 1

A polyurethane prepolymer was prepared using the following procedure: polypropylene ether diol, 3000 molecular weight (41.4 parts), and styrenated diphenylamine (0.40 parts), were charged to a clean, dry reactor. The reactor and its contents were heated with stirring to 110° C. During the heating cycle, powdered talcum (28.2 parts), was added. The reactor was heated to 110° C. under vacuum (5 mm) for 2 hours. The contents of the reactor were sampled and analyzed by Karl Fischer titration for water ($\leq 0.09\%$ $H_2O$). The reactor was evacuated and 15.0 parts of methylene bis(4-phenyl isocyanate) (MDI) containing higher molecular weight oligomers of MDI was added. The contents of the reactor were mixed for 2 hours at 110° C. when an additional 15.0 parts of the above isocyanate mixture was added. The contents of the reactor were mixed and then cooled to 30° C. under vacuum. The NCO content of the final product is 1.92 meq/gm and the viscosity was 16,400 cps (Brookfield). The adhesive base was used in all subsequent experiments.

EXAMPLE 2

Several polyurethane curatives were prepared using the following procedure: A polyol, propylene oxide adduct of pentaerythritol (63.55 parts), and phthalocyanine blue (0.75 parts), were charged to a clean, dry reactor. The reactor was heated to 110° C. while adding powdered talcum (34.25 parts). The polyol/talc slurry was heated at 110° C. under vacuum for 2 hours. A sample was removed for water analysis by Karl Fischer titration ($<0.15\%$ $H_2O$). The reactor was cooled to 65° C. and ethylenediamine, (1.20 parts), and dibutyltin dilaurate catalyst, (0.25 gms), were added. The mixture was stirred and cooled to 30° C. The final product had a viscosity of 8,000 cps (Brookfield). This curative was used with the adhesive base described in Example 1 at a base/curative mix ratio of 3.2/1 to form the final polyurethane adhesive. Several other curatives were prepared in the same way for use at other mix ratios except that the levels of dibutyltin dilaurate catalyst and ethylenediamine were adjusted to give the same level of these ingredients in the final mixed adhesive.

EXAMPLE 3

For testing of adhesive strength, standard lap shear specimens were prepared using the following procedure: FRP panels (14"×14"×0.1") were press molded from a sheet molding compound (glass fiber reinforced unsaturated polyester/styrene). These panels were cut into 4"×6" plaques using a diamond tipped circular saw. Polyurethane adhesive was mixed from the components described in Examples 1 and 2 using adhesive meter-mixing equipment (Model MVR-28 available from Liquid Control Corp.) equipped with a static type mixing head. A bead of mixed adhesive (6" long) was applied along one side of a 4"×6" FRP plaque. The plaque was placed in an aluminum fixture and a second plaque was aligned on top of the adhesive bead to give a final specimen 6"×6" with a 1"×6" overlap bonded area. The aluminum fixture was designed to give a standard 0.035" bond line thickness. The fixture with the bonded sample was placed in an air circulating oven at 125° C. for 30 minutes to cure the adhesive. The bonded specimen was removed from the fixture and excess adhesive was removed from the specimen edges using a knife. The final specimen was placed in an air circulating oven at 150° C. for 1 hour to ensure complete cure. The resultant 6"×6" specimens were then cut into the final test samples (1"×6" with a 1" bonded overlap area) using a diamond tipped circular saw. Before bonding, some of the samples were primed with a 2% solution of polymeric diphenylmethane diisocyanate. The primer was applied to the surface of the FRP using a chemically resistant paint brush.

EXAMPLE 4

The lap shear adhesive samples were tested using standard Instron type testing equipment with a crosshead speed of 0.05"/minute. The Instron had the capability to test at both high and low temperatures. In some cases, samples were tested at 80° C., 166 ° C. and minus 40° C. as well as at room temperature. The resistance of the adhesive bonds to water as determined by conditioning the samples before testing using a water immersion procedure (7 days in water at 54° C.). Samples were tested immediately after removal from the water as well as after an additional 24-hour period in which the samples were exposed to ambient conditions. In addition, in some cases samples were made and tested using FRP which was conditioned at 92% relative humidity before application of adhesive.

EXAMPLE 5

Lap shear adhesive test specimens were prepared using adhesives (Examples 1 and 2) mixed at different mix ratios. This resulted in mixed adhesives of varying isocyanate index. The results for both primed and unprimed samples tested at 82° C. are listed in Table I for adhesives of varying isocyanate index.

EXAMPLE 6

Lap shear adhesive test specimens (both primed and unprimed) were prepared using adhesive mixed at an isocyanate index of 1.40. The specimens were subjected to the water immersion procedure (Example 4) before testing. Results are shown in Table II and compared with samples which were not subjected to water immersion.

EXAMPLE 7

Lap shear adhesion test specimens, both primed and unprimed, were prepared using adhesive mixed at an isocyanate index of 1.40. The specimens were tested at minus 40° C. to determine the adhesion at low temperatures. The results are shown in Table III.

EXAMPLE 8

FRP plaques to be used for bonding were placed in a constant humidity chamber (92% relative humidity at 20° C.). After 24 hours, the plaques were taken from the constant humidity chamber and immediately fabricated into lap shear adhesive test specimens. The samples were tested under different conditions and the results were compared with those from FRP which had not been humidified. The results for the various tests are shown in Table IV.

EXAMPLE 9

Lap shear adhesion samples were fabricated using adhesives mixed at isocyanate indices of 1.40 and 1.12 using the procedures described in Examples 1-3. Lap shear adhesion was determined at 166° C. for both primed and unprimed samples. Results are given in Table V.

EXAMPLE 10

Samples were prepared for evaluation using a Wedge Peel Test. In this test, two 6"×6" plaques of FRP are bonded together at one edge (2"×6"×0.035" adhesively bonded area). A steel wedge 6" long with a 45° angle is attached to an Instron. The wedge is brought into contact with the open end of the bonded specimen. The specimen is mounted in a support on the Instron and carefully aligned in a vertical position. The Instron speed is set at 10"/minute. After testing, the mode of failure is noted as well as the force required for failure. Results for the Wedge Peel Test are given in Table VI.

TABLE I

| Sample No. | Priming | NCO/OH + NH | Adhesive* Strength (PSI) | Sample Failure Mode |
| --- | --- | --- | --- | --- |
| 1A | + | 1.12 | 288 ± 15 | Adhesion Failure |
| 1B | − | 1.12 | 214 ± 27 | Adhesion Failure |
| 1C | + | 1.25 | 390 ± 7.5 | FRP Delamination |
| 1D | − | 1.25 | 274 ± 17 | Adhesion Failure |
| 1E | + | 1.38 | 414 ± 17 | FRP Delamination |
| 1F | − | 1.38 | 415 ± 26 | FRP Delamination |
| 1G | + | 1.50 | 347 ± 33 | FRP Delamination |
| 1H | − | 1.50 | 385 ± 38 | FRP Delamination |

*Average of 5 samples each condition

TABLE II

| Sample No. | Priming | NCO/OH + NH | Water Immersion | Sample Recovery | Adhesive** Strength | Sample*** Failure Mode |
| --- | --- | --- | --- | --- | --- | --- |
| 2A | − | 1.40 | 31 | − | 383 ± 32 | SFD |
| 2B | + | 1.40 | − | − | 384 ± 27 | SFD |
| 2C | − | 1.40 | + | − | 325 ± 36 | SFD |
| 2D | + | 1.40 | + | − | 328 ± 32 | SFD |
| 2E | − | 1.40 | + | + | 305 ± 37 | SFD |
| 2F | + | 1.40 | + | + | 298 ± 16 | SFD |

*Tested 24 hours after water immersion.
**Average of 5 samples each condition.
***SFD - Delamination of the FRP substrate.

TABLE III

| Sample No. | Priming | NCO/OH + NH | Adhesive* Strength (PSI) | Sample Failure** Mode |
| --- | --- | --- | --- | --- |
| 3A | − | 1.40 | 492 ± 38 | SFD |
| 3B | + | 1.40 | 547 ± 27 | SFD |

*Average of samples at −40° C.
**SFD - Delamination of the FRP substrate.

TABLE IV

| Sample No. | FRP Conditioning | Priming | NCO/OH + NH | Water Immersion | Sample Recovery | Test Temp. (°C.) | Adhesive Strength (PSI) | Sample* Failure Mode |
| --- | --- | --- | --- | --- | --- | --- | --- | --- |
| 4A | Humidified | − | 1.40 | − | − | 82 | 275 | SFD/AF |
| 4B | Dry | − | 1.40 | − | − | 82 | 320 | SFD/AF |
| 4C | Humidified | + | 1.10 | − | − | 82 | 163 | AF |
| 4D | Dry | + | 1.10 | − | − | 82 | 239 | AF |
| 4E | Humidified | − | 1.40 | + | − | 22 | 337 | SFD |
| 4F | Dry | − | 1.40 | + | − | 22 | 324 | SFD |
| 4G | Humidified | − | 1.40 | + | + | 22 | 347 | SFD |
| 4H | Dry | − | 1.40 | + | + | 22 | 328 | SFD |
| 4I | Humidified | − | 1.40 | − | − | 22 | 401 | SFD |
| 4J | Dry | − | 1.40 | − | − | 22 | 382 | SFD |

*AF - Adhesion Failure
SFD - Delamination of the FRP

TABLE V

| Sample No. | Priming | NCO/OH + NH | Test Temperature (°C.) | Adhesive* Strength (PSI) | Sample Failure** Mode |
| --- | --- | --- | --- | --- | --- |
| 5A | + | 1.40 | 166 | 90 ± 22 | AF |
| 5B | − | 1.40 | 166 | 76 ± 7 | AF |
| 5C | + | 1.12 | 166 | 66 ± 7 | AF |

TABLE V-continued

| Sample No. | Priming | NCO/ OH + NH | Test Temperature (°C.) | Adhesive* Strength (PSI) | Sample Failure** Mode |
|---|---|---|---|---|---|
| 5D | — | 1.12 | 166 | 48 ± 5 | AF |

*Average of 5 samples
**AF-Adhesion Failure

TABLE VI

| Sample No. | Priming | NCO/ OH + NH | Maximum Force (lbs.) | Sample Failure* Mode |
|---|---|---|---|---|
| 6A | — | 1.40 | 96 | SFD |
| 6B | — | 1.40 | 39 | SFD |
| 6C | + | 1.40 | 51 | SFD |
| 6D | + | 1.40 | 49 | SFD |

*SFD - FRP Delamination

While in accordance with the Patent Statutes, the best mode and preferred embodiment have been set forth, the scope of the invention is not limited thereto, but rather by the scope of the attached claims.

What is claimed is:

1. A two component urethane adhesive, comprising: a urethane prepolymer component and a curative component, said urethane prepolymer component made from a hydroxyl terminated intermediate and a polyisocyanate, the amount of said polyisocyanate being an equivalent excess of at least 2.0 based upon the hydroxyl terminated intermediate so that said prepolymer component has free NCO groups, said curative component comprising a nitrogen-free polyether polyol having OH groups, a nitrogen-free polyester polyol having OH groups, a nitrogen-free low molecular weight polyol, or combinations thereof and a primary polyamine, the amount of said polyol curative being such that the equivalent ratio of said free NCO groups to said OH groups and NH groups of said curative is from about 1.2 to about 2.0, the two component urethane adhesive being capable of bonding to a surface treatment-free plastic, fiber reinforced plastic, or metal.

2. A two component urethane adhesive according to claim 1, wherein said hydroxyl terminated intermediate is a polyester polyol or a polyether polyol having a number average molecular weight of from about 400 to about 10,000, wherein said polyisocyanate has the formula $R(NCO)_n$ where n is an integer of 2, 3 or 4, wherein R is an aliphatic having from 2 to about 20 carbon atoms, an aromatic or an alkyl substituted aromatic having from 6 to 20 carbon atoms, and combinations of said polyisocyanate.

3. A two component urethane adhesive according to claim 2, wherein said polyether polyol intermediate is made from an alkylene oxide having from 2 to 10 carbon atoms, wherein said polyester polyol intermediate is made from a polyhydric alcohol having from 2 to 15 carbon atoms and a polycarboxylic acid having from 2 to 14 carbon atoms, wherein R of said polyisocyanate is an aromatic or an alkyl substituted aromatic having from 6 to 15 carbon atoms, and wherein said curative is a liquid.

4. A two component urethane adhesive according to claim 3, wherein said equivalent excess of said polyisocyanate is from about 5.0 to about 10.0 based upon said hydroxyl terminated intermediate, wherein the equivalent ratio of said free NCO groups to said OH and NH groups of said curative is from about 1.35 to about 1.6, and wherein said nitrogen free low molecular weight polyol curative is alkyl diol having from 2 to 12 carbon atoms, a polyhydric alcohol having from 3 to 15 carbon atoms and from 3 to 8 hydroxyl groups, a carbohydrate having from 5 to 12 carbon atoms and from 4 to 10 hydroxyl groups, or combinations thereof.

5. A two component urethane adhesive according to claim 4, wherein said polyether polyol intermediate and said polyester polyol intermediate has a number average molecular weight of from about 2,000 to about 4,000, wherein said polyol curative is said alkyl diol, said polyhydric alcohol, or said carbohydrate, or combinations thereof, said urethane prepolymer component including a filler, the amount of said filler being from about 5 parts to about 100 parts by weight for every 100 parts by weight of said prepolymer component, and said curative component including a filler, the amount of said filler being from about 5 parts to about 100 parts by weight for every 100 parts by weight of said polyol curative.

6. A two component urethane adhesive according to claim 5, wherein said hydroxyl terminated intermediate is polypropylene ether diol, polybutylene ether diol, polytetramethylene ether diol, polycaprolactone diol, and combinations thereof, wherein said equivalent ratio of said free NCO groups to said OH and NH groups of said curative is from about 1.35 to about 1.45, wherein said polyisocyanate is methylene diphenyl diisocyanate or toluene diisocyanate, and wherein said nitrogen free low molecular weight polyol curative is an ethylene or propylene oxide adduct of trimethylol propane, pentaerythritol, glycerol, an alkyl glucoside wherein said alkyl has from 1 to 12 carbon atoms, or combinations thereof.

7. A two component urethane adhesive according to claim 6, wherein said filler of said prepolymer component and said curative component independently is ground mica, talc, kaolin clay, calcium carbonate, calcium sulfite, colloidal silica, wollastonite, ballotini, hollow glass microspheres, glass, carbon fibers, graphite fibers, zinc oxide, titanium oxide, zirconium oxide, ground quartz, a metallic silicate, lead powder, aluminum powder, bronze powder, or combinations thereof, wherein the amount of said filler in said prepolymer component is from about 20 parts to about 50 parts by weight for every 100 parts by weight of said prepolymer component, and wherein the amount of said filler in said curative component is from about 30 parts to about 60 parts by weight for every 100 parts by weight of said curative component, said prepolymer component including from about 0.1 to about 40 parts by weight for every 100 parts by weight of a polyhydric alcohol having from 2 to 15 carbon atoms, said curative component containing from about 1 part to about 5 parts by weight for every 100 parts by weight of said primary polyamine having from 1 to 14 carbon atoms.

8. A two component urethane adhesive according to claim 7, wherein said filler of said prepolymer component and said curative component is talc, and wherein the amount of said polyhydric alcohol in said prepolymer component is from about 0.1 to about 10 parts by weight for every 100 parts by weight of said polyol intermediate.

9. A urethane adhesive composite containing treatment-free substrates therein, comprising:

the urethane adhesive, said urethane adhesive being the reaction product of a two component system of a urethane prepolymer component and a urethane curative component, said urethane prepolymer component made from a hydroxyl terminated intermediate and a polyisocyanate, the equivalent ratio of said polyisocyanate to said hydroxyl terminated intermediate being from about 2 to 20 so that said prepolymer component contains free NCO groups, said urethane curative component containing a polyol curative having OH groups therein and a primary polyamine containing NH groups therein, the equivalent ratio of said free NCO groups to said OH groups of said polyol curative and said NH groups of said primary polyamine being at least 1.2, at least two surface treatment-free substrate, said substrates bonded together by said urethane adhesive.

10. A urethane adhesive composite according to claim 9, wherein said hydroxyl terminated intermediate is a polyester polyol or a polyether polyol having a number average molecular weight of from about 400 to about 10,000, wherein said polyisocyanate has the formula $R(NCO)_n$ where n is an integer of 2, 3 or 4, wherein R is an aliphatic having from 2 to about 20 carbon atoms, an aromatic or an alkyl substituted aromatic having from 6 to 20 carbon atoms, and combinations of said polyisocyanate.

11. A urethane adhesive composite according to claim 10, wherein said substrate is a treatment-free fiberglass reinforced plastic, a treatment-free metal, or a treatment-free plastic substrate.

12. A urethane adhesive composite according to claim 11, wherein said polyether polyol intermediate is made from an alkylene oxide having from 2 to 10 carbon atoms, wherein said polyester polyol intermediate is made from a polyhydric alcohol having from 2 to 15 carbon atoms and a polycarboxylic acid having from 2 to 14 carbon atoms, wherein R of said polyisocyanate is an aromatic or an alkyl substituted aromatic having from 6 to 15 carbon atoms, wherein said equivalent ratio of said polyisocyanate to said hydroxyl terminated intermediate is from about 5.0 to about 10.0, wherein the equivalent ratio of said free NCO groups and said NH groups to said OH groups of said curative is from about 1.35 to about 1.6, and wherein said polyol curative is alkyl diol having from 2 to 12 carbon atoms, a polyhydric alcohol having from 3 to 15 carbon atoms and from 3 to 8 hydroxyl groups, a carbohydrate having from 5 to 12 carbon atoms and from 4 to 10 hydroxyl groups, or combinations thereof.

13. A urethane adhesive composite according to claim 12, wherein said polyether polyol intermediate and said polyester polyol intermediate has a number average molecular weight of from about 2,000 to about 4,000, wherein said hydroxyl terminated intermediate is polypropylene ether diol, polybutylene ether diol, polytetramethylene ether, polycaprolactone diol, and combinations thereof, wherein said equivalent ratio of said free NCO groups and said OH groups to said OH groups of said curative is from about 1.35 to about 1.45, wherein said polyisocyanate is methylene diphenyl diisocyanate or toluene diisocyanate, and wherein said polyol curative is an ethylene or propylene oxide adduct of trimethylol propane, pentaerythritol, glycerol, an alkyl glucoside wherein said alkyl has from 1 to 12 carbon atoms, or combinations thereof.

14. A urethane adhesive composite according to claim 13, including a filler is said urethane prepolymer component, the amount of said filler being from about 5 parts to about 100 parts by weight for every 100 parts by weight of said prepolymer component, and including a filler in said curative component, the amount of said filler being from about 5 parts to about 100 parts by weight for every 100 parts by weight of said polyol curative.

15. A urethane adhesive composite according to claim 14, wherein said filler of said prepolymer component and said curative component independently is ground mica, talc, kaolin clay, calcium carbonate, calcium sulfite, colloidal silica, wollastonite, ballotini, hollow glass microspheres, glass, carbon fibers, graphite fibers, zinc oxide, titanium oxide, zirconium oxide, ground quartz, a metallic silicate, lead powder, aluminum powder, bronze powder, or combinations thereof, wherein the amount of said filler in said prepolymer component is from about 20 parts to about 50 parts by weight for every 100 parts by weight of said prepolymer component, and wherein the amount of said filler in said curative component is from about 30 parts to about 60 parts by weight for every 100 parts by weight of said polyol curative, said prepolymer component including from about 0.1 to about 40 parts by weight for every 100 parts by weight of a polyhydric alcohol having from 2 to 15 carbon atoms, said curative component containing from about 1 part to about 5 parts by weight for every 100 parts by weight of said primary polyamine having from 1 to 14 carbon atoms.

16. A urethane adhesive composite according to claim 14, wherein said substrate is said treatment-free fiberglass reinforced plastic.

17. A process for adhering at least one treatment-free substrate to another substrate, comprising the steps of:

applying a two component urethane adhesive to at least a first treatment-free substrate, said urethane adhesive being the reaction product of a two component system of a urethane prepolymer component and a urethane curative component, said urethane prepolymer component being made from a hydroxyl terminated intermediate and a polyisocyanate, the equivalent ratio of said polyisocyanate to said hydroxyl terminated intermediate being from about 2 to 20 so that said prepolymer component contains free NCO groups, said urethane curative component containing a polyol curative having OH groups therein and a primary polyamine containing NH groups therein, the equivalent ratio of said free NCO groups to said OH groups and said NH groups of said polyol curative being at least 1.2, applying said two component urethane adhesive to at least a second substrate, and curing said two component urethane adhesive by heating.

18. A process according to claim 17, wherein said second substrate is a treatment-free substrate, wherein said hydroxyl terminated intermediate is a polyester polyol or a polyether polyol having a number average molecular weight of from about 400 to about 10,000, wherein said polyisocyanate has the formula $R(NCO)_n$ where n is an integer of 2, 3 or 4, wherein R is an aliphatic having from 2 to about 20 carbon atoms, an aromatic or an alkyl substituted aromatic having from 6 to 20 carbon atoms, and combinations of said polyisocyanate, and wherein said first and said second substrate is a treatment-free fiberglass reinforced plastic, a treatment-free metal, or a treatment-free plastic substrate.

19. A process according to claim 18, including curing said two component urethane adhesive by heating said adhesive to a temperature above 50° C., wherein said polyether polyol intermediate is made from an alkylene oxide having from 2 to 10 carbon atoms, wherein said polyester polyol intermediate is made from a polyhydric alcohol having from 2 to 15 carbon atoms and a polycarboxylic acid having from 2 to 14 carbon atoms, wherein R of said polyisocyanate is an aromatic or an alkyl substituted aromatic having from 6 to 15 carbon atoms, wherein said equivalent ratio of said polyisocyanate to said hydroxyl terminated intermediate is from about 5.0 to about 10.0, wherein the equivalent ratio of said free NCO groups to said OH groups and said NH groups of said curative is from about 1.35 to about 1.6, and wherein said polyol curative is alkyl diol having from 2 to 12 carbon atoms, a polyhydric alcohol having from 3 to 15 carbon atoms and from 3 to 8 hydroxyl groups, a carbohydrate having from 5 to 12 carbon atoms and from 4 to 10 hydroxyl groups, or combinations thereof.

20. A process according to claim 19, wherein said first and said second treatment free substrates are a fiberglass reinforced plastic.

21. A urethane adhesive capable of bonding to a treatment-free surface of plastic, fiber reinforced plastic, or metal comprising:
a urethane prepolymer component made from a hydroxyl terminated intermediate and a polyisocyanate, the equivalent ratio of said polyisocyanate to said hydroxyl terminated intermediate being at least 2.0 so that said prepolymer component has free NCO groups, and
a curative component having OH groups,
the equivalent ratio of said free NCO groups of said prepolymer to said OH groups of said polyol curative being at least 1.2.

* * * * *

UNITED STATES PATENT AND TRADEMARK OFFICE
CERTIFICATE OF CORRECTION

PATENT NO. : 4,876,308

DATED : October 24, 1989

INVENTOR(S) : Earl G. Melby, William Cocain

It is certified that error appears in the above-identified patent and that said Letters Patent is hereby corrected as shown below:

Column 15, lines 45-46, change "and said NH groups to said OH groups" to --to said OH groups and said NH groups--.

Column 15, lines 62-63, change "and said OH groups to said OH groups" to --to said OH groups and said NH groups--.

Signed and Sealed this

Ninth Day of March, 1993

Attest:

STEPHEN G. KUNIN

*Attesting Officer*     *Acting Commissioner of Patents and Trademarks*